US005590047A

United States Patent [19]
Uehara

[11] Patent Number: 5,590,047
[45] Date of Patent: Dec. 31, 1996

[54] INFORMATION PROCESSING APPARATUS

[75] Inventor: Nagatoshi Uehara, Tokyo, Japan

[73] Assignee: Clarion Co., Ltd., Saitame-ken, Japan

[21] Appl. No.: 284,358

[22] Filed: Aug. 2, 1994

[30] Foreign Application Priority Data

Aug. 5, 1993 [JP] Japan .................................. 5-212160
Aug. 5, 1993 [JP] Japan .................................. 5-212161

[51] Int. Cl.$^6$ .......................... G06F 17/00; G11B 15/68; G11B 17/22
[52] U.S. Cl. .................. 364/478.02; 360/92; 369/34
[58] Field of Search ............................ 364/478; 360/91, 360/92; 369/27, 34–39, 30–33

[56] References Cited

U.S. PATENT DOCUMENTS

| 4,993,010 | 2/1991 | Kishimura et al. | 369/36 |
| 5,182,686 | 1/1993 | Lindenmeyer | 360/92 |
| 5,264,974 | 11/1993 | Campbell et al. | 360/92 |

FOREIGN PATENT DOCUMENTS

| 482016 | 1/1992 | Japan . |
| 4280052 | 4/1992 | Japan . |
| 4329694 | 5/1992 | Japan . |

Primary Examiner—Roy N. Envall, Jr.
Assistant Examiner—Thomas E. Brown
Attorney, Agent, or Firm—Price, Gess & Ubell

[57] ABSTRACT

A data processing device which is improved in operational performance and is capable of storing a plurality of disk-shaped recording media. The above device includes a detection function of detecting empty compartment(s) of a stocker from a plurality of compartments 50a–50d differentiated by the identification numbers loaded with a plurality of MDs. The device is further provided with the following three functions. A setting function selects one of empty compartments and sets it as a designated compartment in which a disk to be stored. In response to the depression of one of No. keys so as to set one of the empty compartments as a newly designated compartment, a resetting function resets the designated empty compartment from the compartment set by the setting function to the newly designated compartment. Upon detection of the insertion of an MD through an insertion slot, a transmission function transmits a drive signal to allow the MD to be stored in the newly designated compartment.

21 Claims, 10 Drawing Sheets

INFORMATION PROCESSING APPARATUS

BACKGROUND OF THE INVENTION

1. Field of the Invention

The present invention relates to an information processing apparatus for executing a predetermined processing, for example, recording information on a recording medium, or reproducing the data recorded on the recording medium.

2. Description of Related Art

Conventionally, a Compact Disk (hereinafter simply referred to as "CD") is widely known as a recording medium on which information is recorded. Also becoming popular is a player provided with compartments referred to as "a magazine," which can be loaded with a plurality of CDs, and which is installed in the trunk of a car, while the main unit, referred to as "the control unit," is placed near the driver's seat. With this kind of system, by using the main unit the user is able to select any desired disk from the CDs stored in the trunk and reproduce the information recorded on the selected CD, without leaving the driver's seat.

Another recording medium which has been developed in recent years is a Mini Disk player (hereinafter simply referred to as "MD") of the magneto-optical recording type which is loaded with an information disk contained in a protective case. With this MD player, it is possible not only to reproduce prerecorded information, but also to newly record information and to erase and record over information already recorded.

Various types of recording/reproducing units compatible with such MDs are currently being developed.

OBJECTS AND SUMMARY OF THE INVENTION

Accordingly, an object of the present invention is to provide a data processing device in which the operational performance of the device is improved by permitting the selection of any desired MD from a plurality of MDs loaded therein, and the reproduction of the information recorded on the selected MD can be easily accomplished.

For this purpose, according to the present invention, there is provided an information processing apparatus for performing a predetermined processing of the information recorded in a recording medium inserted into the apparatus. The apparatus includes a plurality of storing positions capable of storing the recording medium and a holding member movable among a processing position at which the predetermined processing is performed and positions opposed to each of the storing positions for holding the recording medium. The information processing apparatus includes a first designating means for designating one of the storing positions to which the recording medium is to be stored; a second designating means for designating a position at which the inserted recording medium is to be located; and determining means for determining the position designated by the second designating means as a position at which the recording medium is to be located when a position other than that designated by the first designating means is designated by the second designating means.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically.

A description will now be given of an MD unit, which is used in a car, as an embodiment of a data processing device according to the present invention with reference to the drawings.

The MD unit is adapted to load an MD therein so as to record information on the MD and/or reproduce information recorded in the MD.

Figure 1:
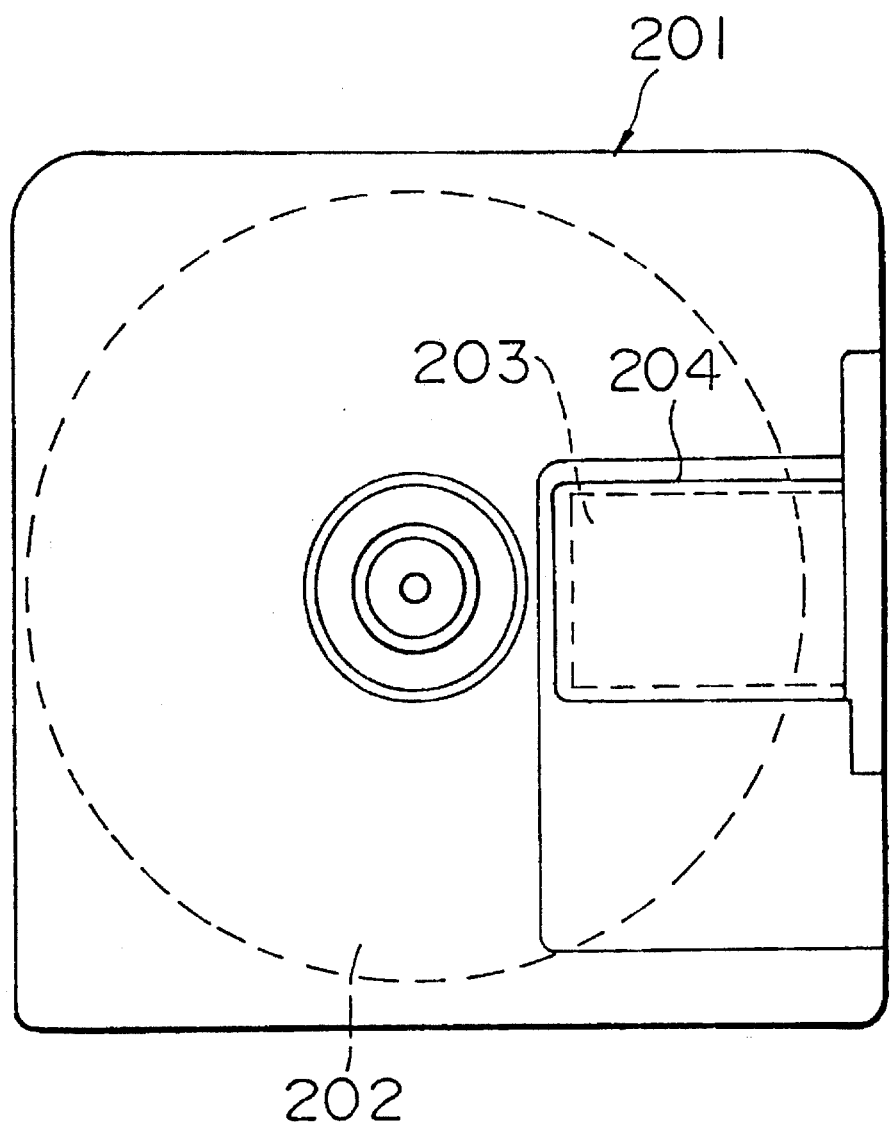
FIG. 1 is a plan view of the construction of an MD which can be used as a recording medium and which is applicable to the data processing device of the present invention.

Reference will first be given of an MD applicable to the MD unit of this embodiment according to the present invention. FIG. 1 is a plan view of such an MD.

Referring to FIG. 1, the MD includes a cassette case 201, an information-recording disk 202 stored in such a cassette case 201 and used as a magneto-optical disk having a diameter of approximately 6 cm, an access window 203 arranged in the cassette case 201 so as to allow the disk 202 to be accessed through this window 203, and a slide shutter 204 for opening and closing the access window 203 (hereinafter simply referred to as "the shutter"). Since the shutter 204 is closed at all times other than when the disk 202 is in use, it is capable of protecting the disk 202 from the external environment, thereby making the MD unit very practical and durable.

There are two different types of MDs: a read only premastered type, which has prerecorded information on it, and a recordable type on which information can be written. The premastered type shutter 204 is arranged only on one side of the cassette case 201 and, when it is opened, a light beam from a below-mentioned pickup can be applied onto the surface of the disk 202. The recordable-type shutters 204, on the other hand, are arranged on both sides of the cassette case 201. When information is recorded onto the disk 202, a magnetic head to which a magnetic field is applied is constructed to abut against both the side of the disk on which a light beam impinges, as well as the opposite side of the disk.

Unless otherwise stated, a recording medium including the cassette case 201 and the disk 202 is hereinafter referred to as "a disk" for convenience in description.

Figure 2:
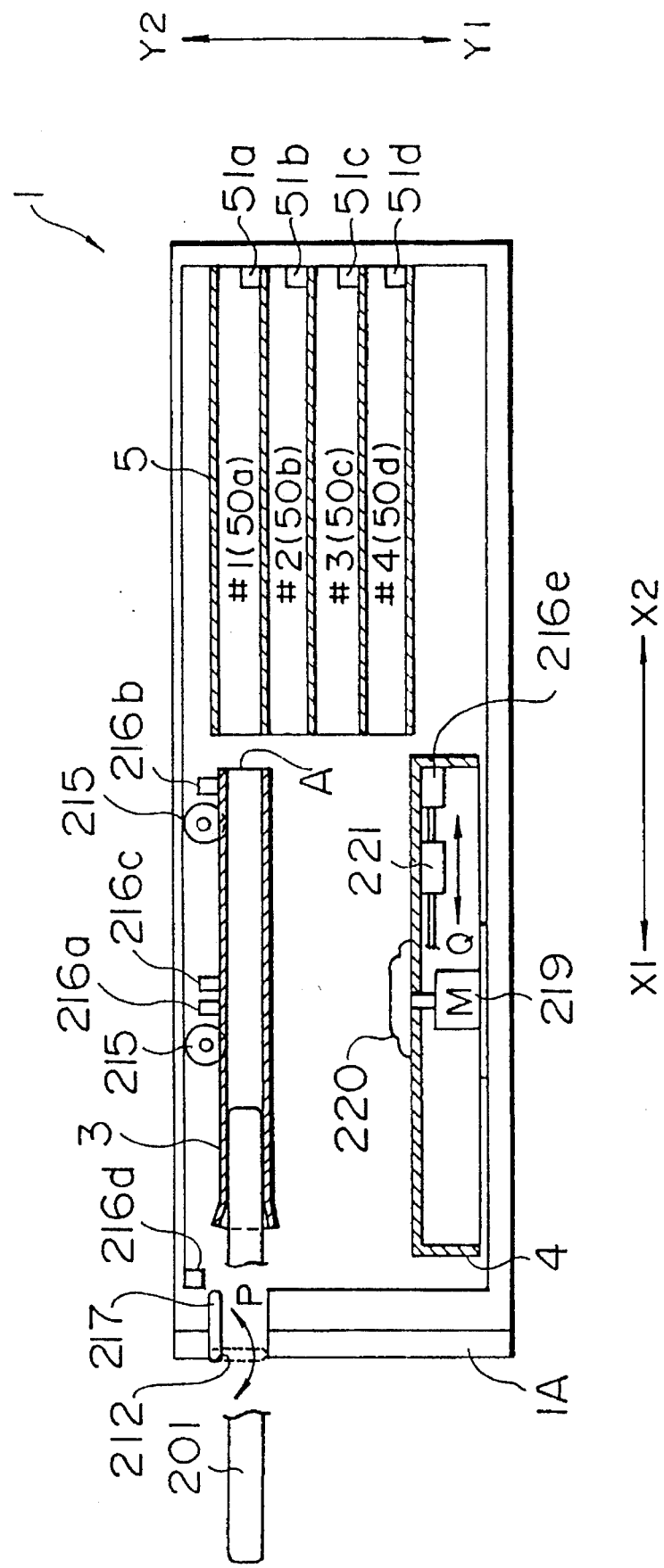
FIG. 2 is an internal sectional view of a MD unit, constructed to be installed in a car while a disk is inserted into the unit according to one embodiment of the present invention.

Referring to FIG. 2, an explanation will now be given of the MD unit for reproducing/recording the disk of this embodiment. The arrows X1 and X2 indicate the horizontal direction of the MD unit and the arrows Y1 and Y2 indicate the vertical direction of the MD unit. Accordingly, the X1 side and X2 side of the arrows will be referred to as the front side and the rear side, respectively, and the Y1 side and the Y2 side of the arrows will be referred to as the lower side and the upper side, respectively.

FIG. 2 is a schematic sectional view of the internal construction of the MD unit while a disk is inserted. The MD unit comprises respective components arranged in a rectangular-prism equipment case generally denoted by 1.

An insertion slot 212 through which a disk is inserted is formed at the upper front end of the equipment case 1 as viewed from the front side of the case 1. An opening/closing door 217 is attached to the insertion slot 212 to be pivotable in the direction indicated by the arrows P, thereby preventing extraneous matter from entering into the MD unit.

Within the case 1, the following components are placed: a carrier 3 for transferring and holding a disk which is inserted through the insertion slot 212, a player 4 for rotating a desired disk selected from the disks stored in a below-mentioned stocker 5, and the stocker 5 for storing the disks inserted into the case.

The carrier 3 is placed behind the insertion slot 212 to be vertically movable. A pair of feeding rollers 215 are rotatably placed at the top of the carrier 3 to load the disks into the carrier 3, then to store them into the stocker 5, and further to eject the disks placed on the carrier 3 through the insertion slot 212.

Various sensors are also mounted on the carrier 3 so as to detect that a disk has been inserted, loaded and ejected, and the like. Such sensors include a disk insertion sensor 216a for detecting that a disk has been inserted, a loading completion sensor 216b for detecting that a disk is fully loaded into the carrier, an eject sensor 216c for detecting that a disk has been ejected through the insertion slot 212, and a disk removal sensor 216d for detecting that a disk has been removed from the unit.

The above-noted loading completion sensor 216b detects that a disk is fully loaded into the carrier 3 by sensing that the forward end of the disk loaded by the feeding rollers 215 has reached the position A in FIG. 2; that is, the rearmost end of the carrier 3. The eject sensor 216c detects that a disk has been ejected from the carrier 3 as far as a position from which it can be taken out of the insertion slot 212; that is, the reload position in which a part of the disk is protruding from the case 1. The disk removal sensor 216d is placed in the neighborhood of the insertion slot 212 to detect that the disk which has been moved to the reload position has been removed.

A carrier position sensor (not shown) is further provided for the carrier 3 so as to accurately detect the vertical position of the carrier 3. By this carrier sensor 3, it is possible to vertically align the positions of the carrier 3, the insertion slot 212 and one of respective compartments stored in the stocker 5, which compartments will be described below, thereby smoothly performing the horizontal movement of the disk; that is, the movement of the disk between the insertion slot 212 and the carrier 3, or between the carrier 3 and one of the compartments stored in the stocker 5.

The player 4 is placed underneath the carrier 3 and facing opposite thereto, being resiliently fixed to the case 1 via a damper or an antivibration spring (not shown). Thus, when a disk is being rotated, the player 4 is in a state in which it is resiliently supported by the damper and the antivibration spring so that any external vibration applied to the case 1 can be prevented from being transmitted to the player 4. At all times other than when a disk is being rotated, the player 4 is constructed to be stationary to the case 1. When a disk is being rotated, on the other hand, the carrier 3 itself, loaded with the disk, is placed on the player 4.

The player 4 includes a spindle motor 219 for rotating a disk, a turntable 220 for having a disk mounted thereon, and a pickup (PU) 221 which applies a light beam onto a disk so as to read information from the disk, such a pickup being constructed to slide radially with respect to a disk mounted on the turntable 220; that is, to slide in the direction indicated by the arrows Q in FIG. 2. Also mounted on the player 4 is a disk placement completion sensor 216e, which detects that a disk has been placed on the turntable 220 by sensing that the cassette case 201 abuts against the sensor 216e.

The stocker 5 is a rectangular-prism case in which four compartments 50a–50d for storing disks therein are vertically stacked. It is placed further behind the carrier 3, as viewed from the insertion slot 202, so as to be vertically movable. The compartments 50a–50d are identified as numbers #1–#4, the compartment 50a being #1, the compartment 50b being #2, the compartment 50c being #3, and the compartment 50d being #4. These identification numbers #1–#4 correspond to the order of storing disks when the unit is in a stock mode, which will be described below, the compartments 50a–50d sequentially storing disks, starting from #1, followed by #2, #3, and #4.

An opening is formed at the front of each of the compartments 50a–50d so as to receive a disk through such an opening, and behind the opening is a space in which a disk can be horizontally stored. The compartments 50a–50d are provided with stock completion sensors 51a–51d, respectively, for detecting completion of storing disks, and with a disk eject/pull-in mechanisms (not shown) for ejecting/pulling disks from/into the compartments due to an urging force of the springs.

As stated above, the door 217 is placed near the insertion slot 212 to freely open and close. Such a door 217 is in an unlocked state when the carrier 3 is positioned oppositely facing the insertion slot 212, while the door 217 is in a locked state when the carrier 3 is placed in any position other than it is oppositely placed to the opening of the compartment 50a. Thus, when the insertion slot 212 and the carrier 3 are not positioned to face to each other, the door 217 is locked, thereby preventing extraneous matter from entering into the MD unit.

As illustrated in FIG. 2, a front panel 1A, which is equipped with depression input functions and with an information display function, is provided for the front of the case 1.

Figure 3:
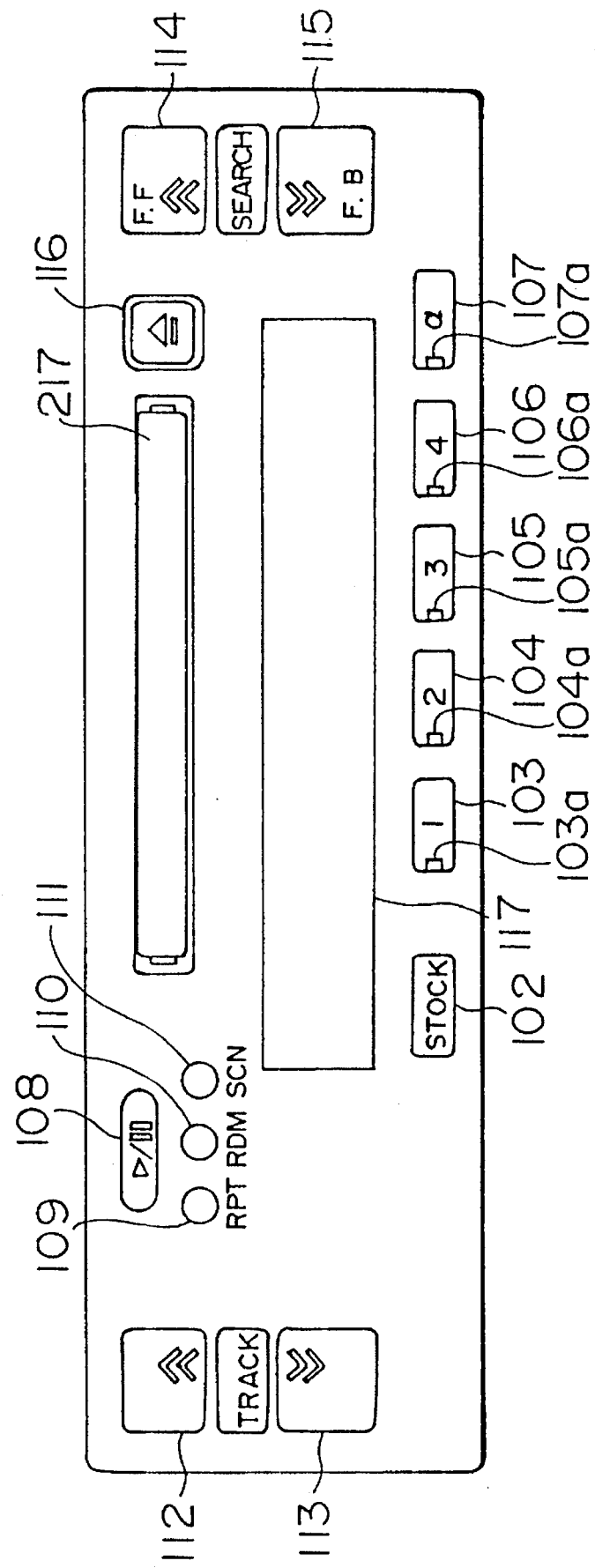
FIG. 3 illustrates a front panel of the MD unit shown in FIG. 1.

Referring to FIG. 3, a stock key 102 is depressed to input a stocking instruction to instruct the unit to stock an inserted disk into the stock 5. MD designation keys 103–106 (hereinafter simply referred to as "No. keys") corresponding to the compartments 50a–50d, respectively, are depressed to designate the respective compartments and also designate disks which are stored in the respective compartments. A standby MD designation key α 107 (hereinafter simply referred to as "α key") is depressed to designate a fifth disk; that is, the disk loaded in the carrier 3. LED indicators 103a–107a (hereinafter simply referred to as "No. lamps") are provided for the respective keys. As stated above, the No. keys 103–106 correspond to the compartments 50a–50d, respectively. One of the No. keys is depressed before a disk is inserted into the unit so that the disk can be stored in the compartment corresponding to the depressed No. key.

A play/pause key 108 is depressed to input a play instruction when a disk is to be played. When this key is depressed at a time other than when a disk is already being played, the unit will switch to the play mode. When the play/pause key 108 is depressed while a disk is being played, the unit will switch to the pause mode or the stop mode. Input keys 109–111 are depressed to set the unit into the special play modes: an RPT key 109 puts the unit into the a repeat play mode in which a disk is played repeatedly; an RDM key 110 puts the unit into a random play mode in which the respective disks and/or the tracks are reproduced and played randomly; and an SCN key 111 puts the unit into a scanning play mode in which the first parts only of the tracks are played, one after another.

A key 112 is depressed to input an instruction to the unit to play the previous track, and a key 113 is depressed to input an instruction to the unit to play the subsequent track. Keys 114 and 115 are fast-forward and fast-backward keys, respectively. These keys are depressed while the unit is in the play mode so as to put the unit into the search play by what is called "cue and review." An eject disk 116 is depressed to input an eject instruction to instruct the unit to eject a disk. An LCD display 117 displays the operating state of the unit. That is, it can display letters, symbols, and numeric characters up to a maximum of, for example, 15 characters, for example, displaying a title of the disk which is being reproduced.

The mechanism of the MD unit constructed as described above has been applied as Japanese Patent Application Nos. 4-329694, 4-280052 and 4-82016 by the present inventor.

Figure 4:
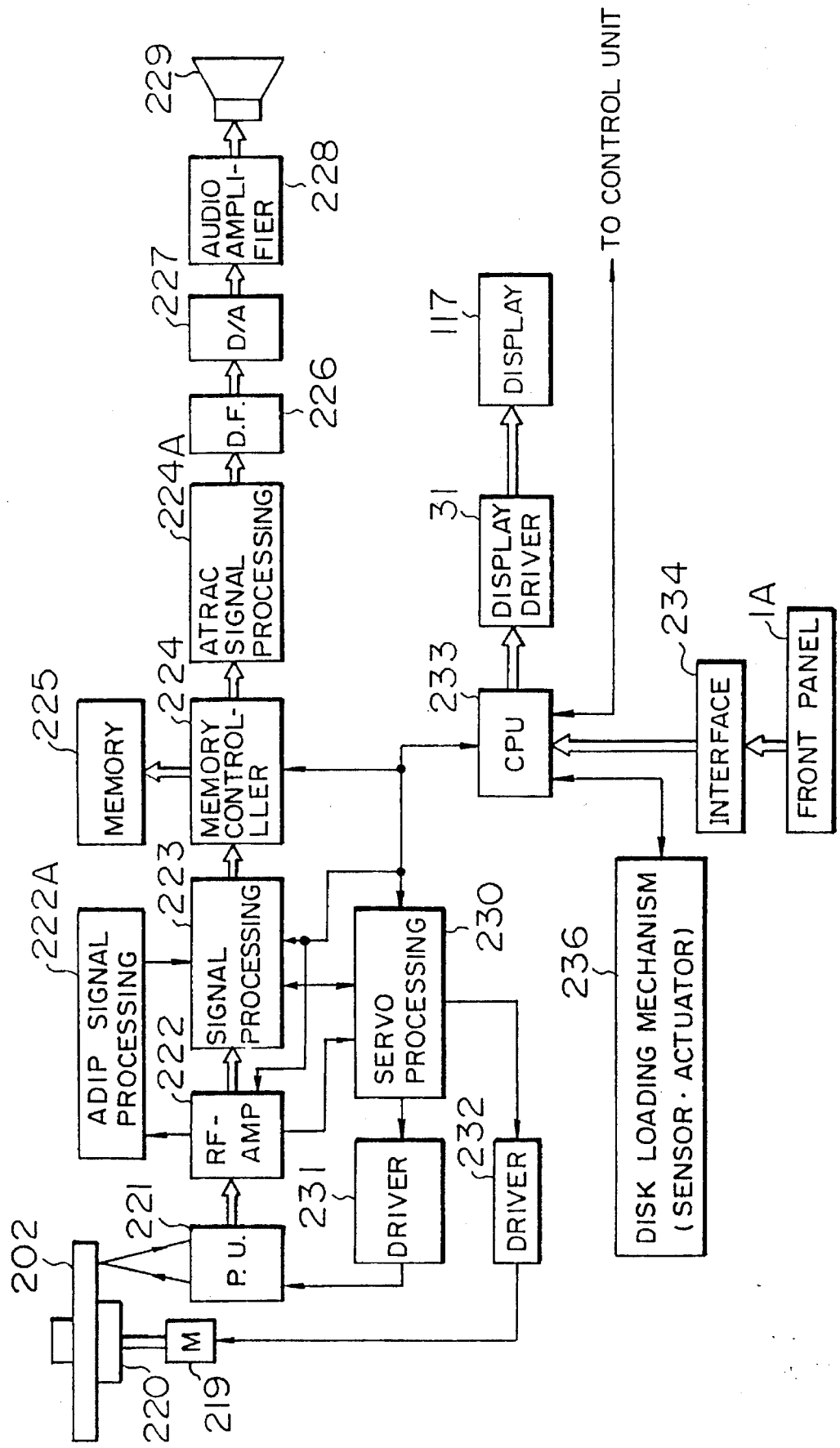
FIG. 4 is a block diagram of the construction of the MD unit shown in FIG. 1.

An explanation will now be given of control sections for controlling the MD unit and signal processing sections with reference to FIG. 4. FIG. 4 is a block diagram of the construction of the control sections and the signal processing sections. In the drawing, heavy lines indicate the data flow, while thin lines indicate the flow of the control signals. Since the spindle motor 219, the turntable 220, the pickup 221, the disk 202, and the display 117 have already been described above, an explanation of these components will be omitted.

An RF amplifier 222 amplifies a radio frequency signal which is output from the pickup 221. A signal processing section 223 converts the signal obtained from the RF amplifier 222 into a digital signal indicative of sound data and also executes predetermined processing. In order to execute the above conversion and processing, an ADIP (Address In Pre-Groove) signal processing section 222A decodes an address signal from the RF amplifier 222 so as to execute signal processing based on the decoded data. A memory controller 224 compresses the sound data transmitted from the signal processing section 223 along the time axis so as to write the compressed data into a memory 225, and also expands the time axis of the sound data read from the memory 225. An ATRAC (Adaptive Transform Acoustic Coding) circuit 224A is also arranged to make various hearing corrections to the sound data which is output from the memory controller 224. A digital filter 226 makes various acoustic corrections to the sound data. A D/A converter 227 converts the digital signal indicative of the sound data into an analog signal so as to transmit the analog sound signal. An audio amplifier 228 amplifies the analog sound signal. A speaker 229 outputs the amplified analog sound signal.

A servo processing section 230 receives a readout synchronization signal component from the RF amplifier 222, and other signals, such as a tracking error signal, so as to generate a drive control signal for controlling the operation of the pickup 221. In response to the drive control signal from the servo processing section 230, a driver 231 generates drive signals for driving a light beam-emitting device, a tracking actuator for moving the pickup 221 in the tracking direction, and a focus actuator for moving the pickup 221 in the focusing direction (none of which are shown in FIG. 4). In response to the drive control signals from the servo processing section 230, a driver 232 generates drive signals for driving drive mechanisms, such as the spindle motor 219.

A CPU 233 controls the overall MD unit and communicates with a control unit (not shown). A key input interface 234 receives input data obtained by depressing the keys mounted on the front panel 1A shown in FIG. 3 and supplies such data to the CPU 233. A disk loading mechanism 235, controlled by the CPU 233, comprises the foregoing various sensors 216a–216e, the actuators, and the like, so that it controls the operation of the carrier 3, and also comprises the stock completion sensors 51a–51d, the actuators, and the like, so that it can control the operation of the stocker 5. A display driver 237 drives the display 117 based on the display data which is output from the CPU 233. Although this embodiment is applied to a reproducing system only for reproducing data recorded on a disk, if a magnetic head is provided, the present invention can be constructed of a recording/reproducing system.

Figure 5:
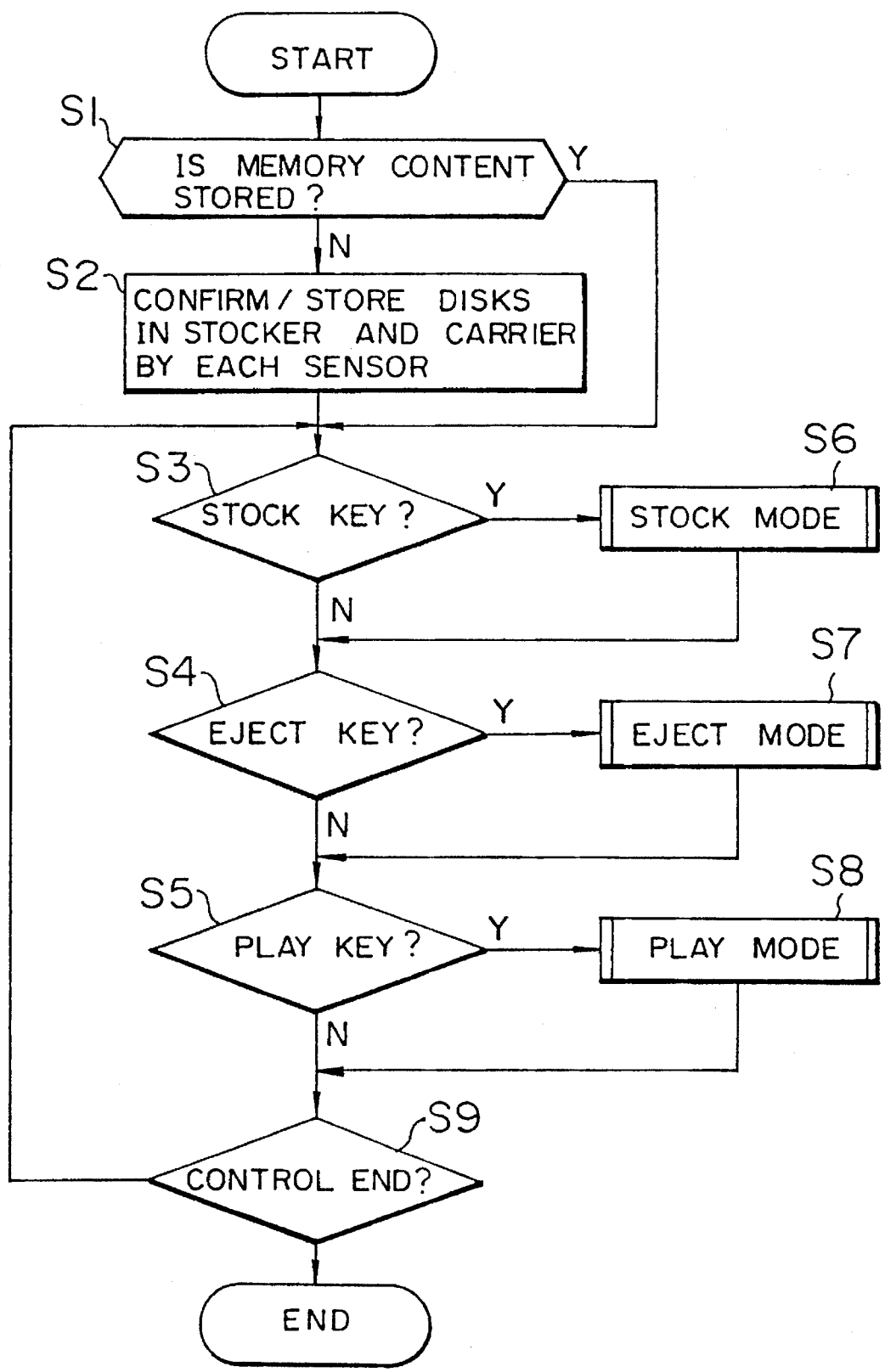
FIG. 5 is a flow chart illustrative of the main routine of the control operation in the MD unit shown in FIG. 1.

The operation controlled by the CPU 233 in the MD unit according to the present invention will now be described with reference to the flow charts illustrated in FIGS. 5–9. FIG. 5 illustrates a flow chart of the main routine representing the main processing operation of the CPU 233 in the MD device.

Referring to FIG. 5, when the power supply of the MD unit is turned ON, the unit determines whether the data stored before the power supply is turned ON is held in the memory 225 by the backup power of a car, such data being related to disks stored in the stocker 5 and loaded in the carrier 3. For example, the data indicating in which compartment 50a–50e of the stocker 5 a disk is stored is determined (step S1, the step will be hereinafter referred to as "S"). If the disk data is not held in the memory 225, the disks in the MD unit are detected by various sensors arranged in the MD unit, for example, the disk insertion sensor 216a, the loading completion sensor 216b, the eject sensor 216c, the disk removal sensor 216d, the disk placement completion sensor 216e, and the stock completion sensors 51a–51d, so that the data indicative of the disks in the unit; that is, the disk data, can be newly generated and stored in the memory 225 (S2).

Whether the stock key 102 has been depressed to input a stocking instruction is determined (S3). If the answer is NO in S3, whether the eject key 116 has been depressed is determined (S4). If the answer is NO in S4, whether the play key 108 has been depressed is determined (S5). If the answer is No in S5, the flow proceeds to S9. On the other hand, if the disk data is held in the memory 225 in S1, the flow proceeds to S3. In other words, unless instructions to move a disk or to perform the reproducing operation of the data recorded on the disk are given to the CPU 233 by the depression of the keys, the unit waits for the above instructions to be input thereinto while holding the content of the memory 225. If the control end, such as the power OFF, is detected in S9, the flow proceeds to END.

If the stock key 102 has been depressed to input a stocking instruction, it is identified in S3, and the unit is permitted to switch to the stock mode in which the disk which has been inserted through the insertion slot 212 is stored in one of the compartments 50a–50d. Then the flow proceeds to S4.

When an eject key 116 has been depressed to input an ejecting instruction, as identified in S4, the unit is permitted to switch to the eject mode in which a disk in the MD unit is ejected through the insertion slot 212. Then the flow proceeds to S5.

If the play key 108 has been depressed to input a play instruction, as identified in S5, the disk is placed on the player 4 and the unit is permitted to switch to the play mode in which the data recorded on the disk is reproduced (S8).

Subsequently, the stock mode in S6 will now be explained in detail with reference to FIGS. 6–9. FIGS. 6–9 are flow charts illustrating the processing operation of the CPU 233 when the unit is in the stock mode.

Figure 6:
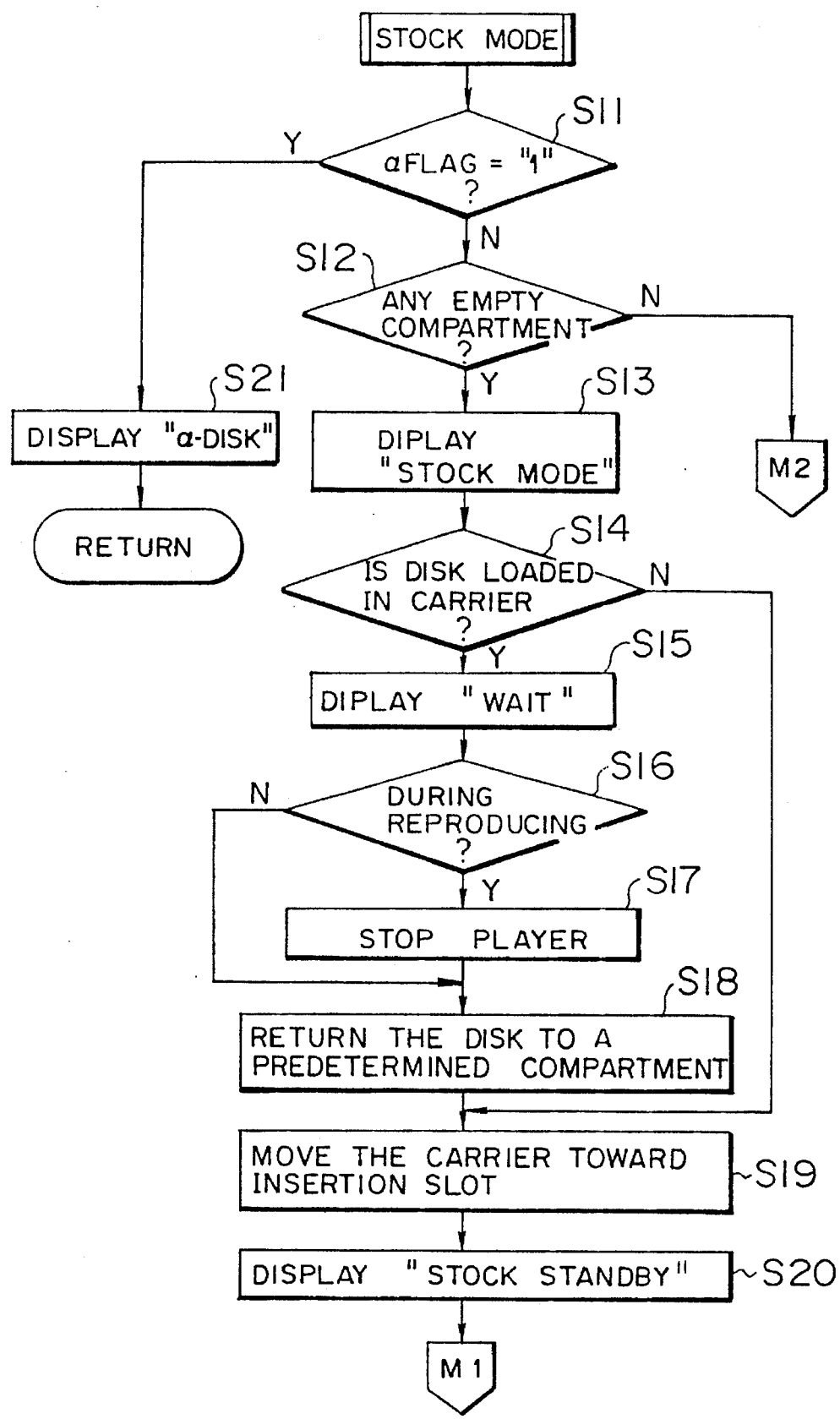
FIG. 6 is a flow chart illustrative of the operation processed by a CPU when the MD unit is in the stock mode.

In the flow chart of FIG. 6, whether the α flag is "1" is determined (S11). This α flag will now be explained in detail. As shown in FIG. 5, when the stock key 102 is depressed to input a stocking instruction, the unit is switched to the stock mode and is in the standby state until one of the No. keys 103–106 is depressed to designate one of the compartments 50a–50d of the stocker 5, as will be described below. If the α key 107 shown in FIG. 3 is depressed when the unit is switched to the stock mode, the disk which has been inserted through the insertion slot 212 (hereinafter referred to as "the α-disk") is not stored in one of the compartments 50a–50d (#1–#4), but instead placed on the player 4 even though any empty compartment is available. Then, the α flag is switched to "1" and, accordingly, this disk is not stored in any of these compartments while remaining in the unit.

In other words, when the α flag is "1," even though disks are stored in the compartments 50a–50d (#1–#4), the data recorded on these disks are prohibited from being processed, and data processing is executed only on the disk which is inserted into the unit in response to the depression of the α key 107 and placed on the player 4.

If the eject key 116 is depressed to input an eject instruction when the α flag is "1," the α-designated disk; that is, the disk placed on the player 4, is immediately ejected from the unit and, accordingly, the α flag is switched to "0." Thus, a desired disk can be selected from the disks stored in the compartments 50a–50d and placed on the player 4, thereby enabling the data processing to be executed again on the data in the disk.

When the α flag is "1" as described above, even though this MD unit is capable of storing a plurality of disks, it is manipulated to store only one disk, which is designated by the depression of the α key 107 and to execute data processing on such a disk.

As will be described below, after the MD unit is switched to the stock mode, when a disk is inserted into the unit in the state where the respective compartments 50a–50d are totally full; that is, no empty compartment is available, the a flag is automatically switched to "1" without requiring the user to depress the α key 107, and the data processing is executed on the inserted disk.

Figure 9:
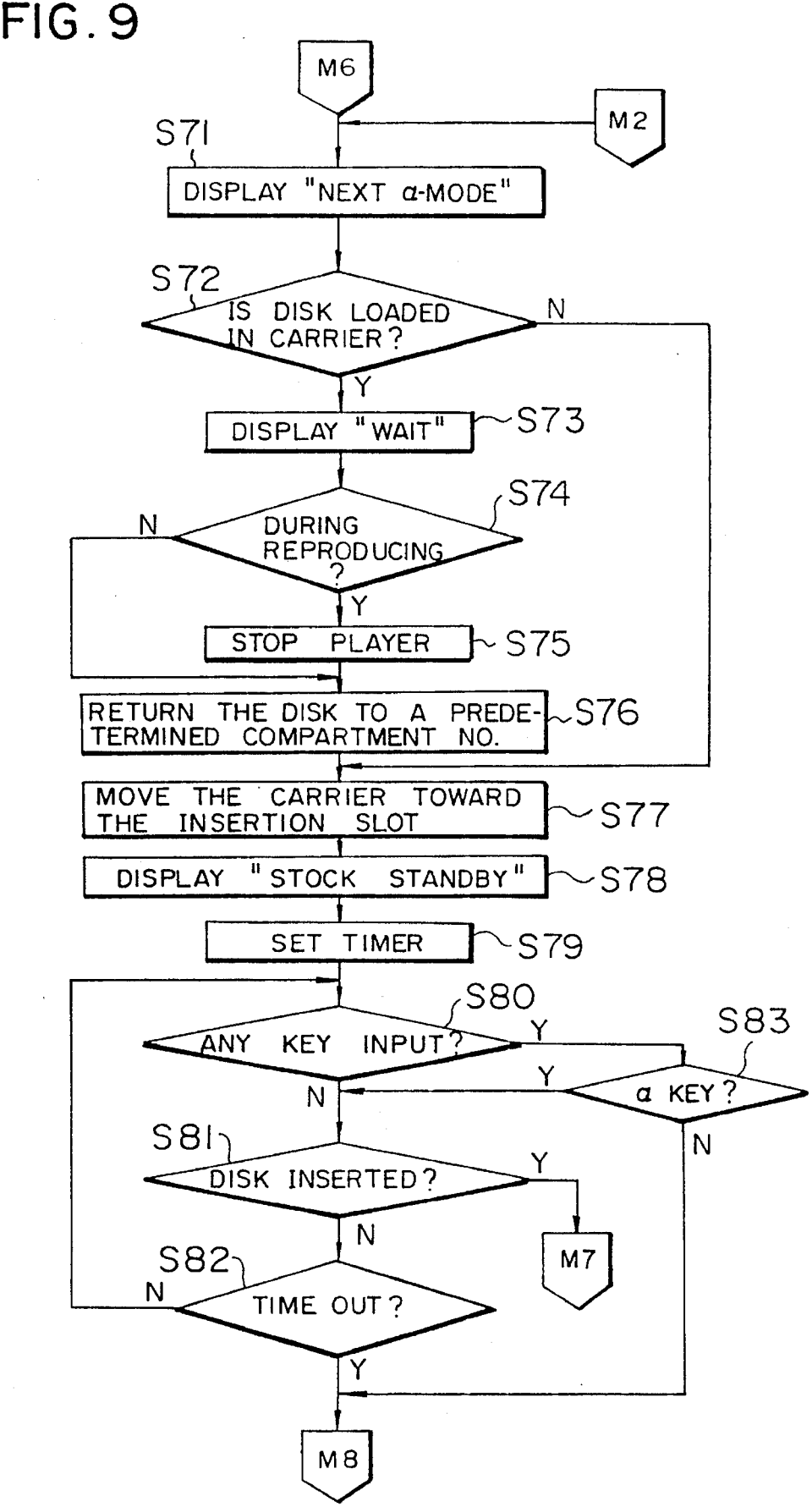
FIG. 9 is a flow chart illustrative of still another partial operational processed by the CPU when the MD unit is in the stock mode.

Referring back to FIG. 6, when the α flag is not "1" is determined in S11, while whether any of the compartments 50a–50d in the stocker 5 is empty is determined in S12. Hereinafter, any empty portion in the MD unit in which a disk to be stored based on the foregoing disk data; that is, any compartment of the stocker 5, the player 4 or the carrier 3 is referred to as an "empty storage." If the α flag is "1," as determined in S11, the MD unit informs the user that the α-disk is currently loaded in the carrier 3 and allows the unit to display "α-disk" on the display 117 (S21), thus completing the stock mode. On the other hand, if no empty compartment is available in the stocker 5, as determined in S12, the flow proceeds to M2 in which the control illustrated in the flow chart of FIG. 9 is executed.

If any empty storage is detected in S12, the MD unit is allowed to display "STOCK MODE" on the display 117 to inform the user that the MD unit is switched to the stock mode (S13), and whether a disk is loaded in the carrier 3 is determined (S14). If the answer is YES in S14, the MD unit is permitted to display "WAIT" on the display 117 to inform the user that a disk cannot be inserted into the unit and to urge the user to wait (S15). Then, whether a disk is being reproduced on the player 4 is determined (S16). S16 is executed for the following reason. As described above, the carrier 3 loaded with a disk therein is placed on the player 4, and then the disk in the carrier 3 is rotated to be reproduced. Thus, when "WAIT" is displayed on the display 117, a disk in the carrier 3 might be rotated on the player 4. If the answer is YES in S16, the player 4 is allowed to stop rotating (S17). Then the disk loaded in the carrier 3 is stored in a predetermined compartment based on the disk data (S18). If the answer is NO in S16, the flow proceeds to S18.

In S18, after a disk is returned to the predetermined storage, the carrier 3 is moved to a position oppositely facing the insertion slot 212, and the door 217 is unlocked (S19). Then the MD unit is permitted to display "STOCK STANDBY" on the display 117 to inform the user that a disk can now be inserted into the unit. The flow proceeds to M1 in which the control illustrated in the flow chart of FIG. 7 is executed.

Figure 7:
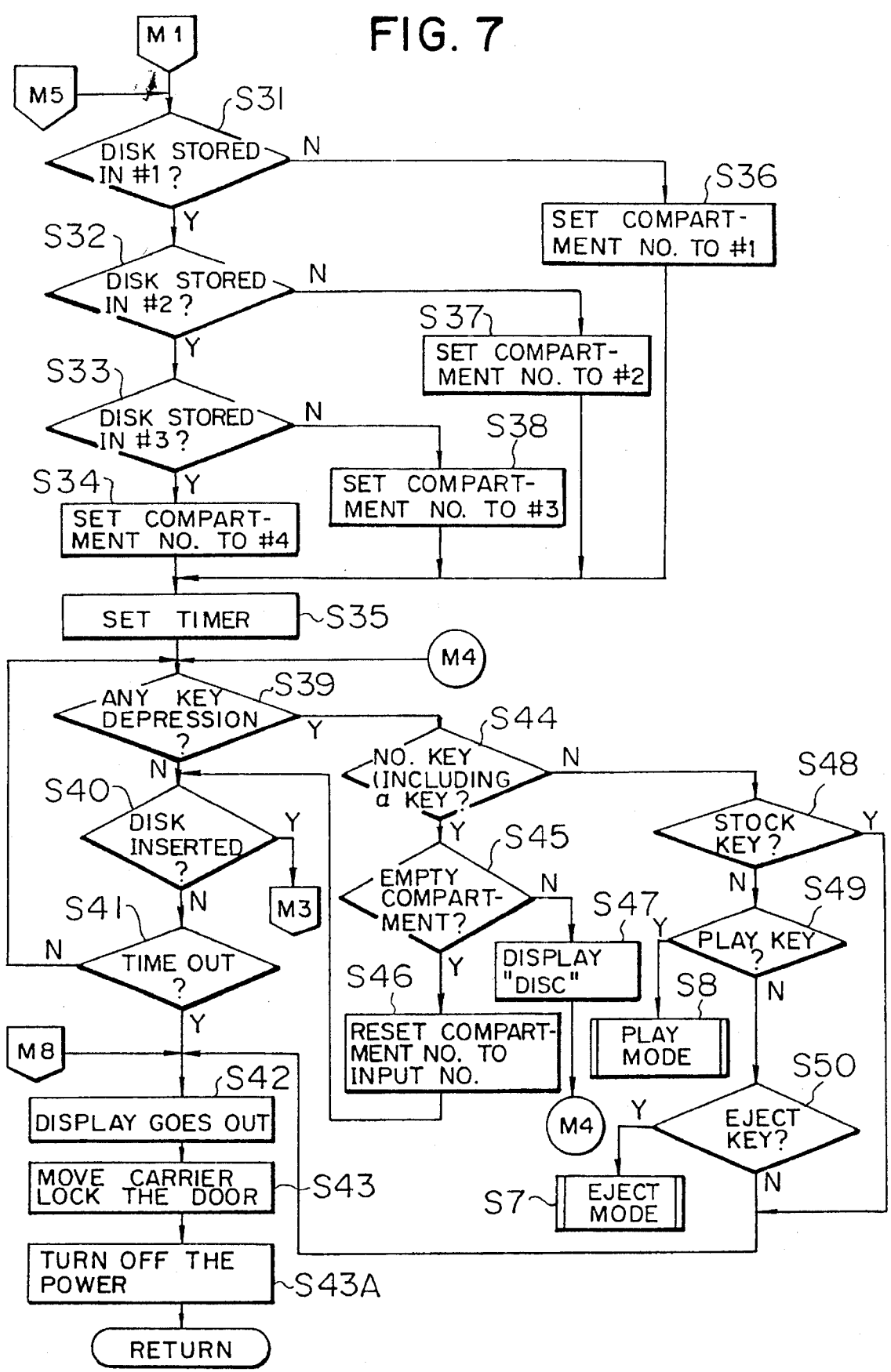
FIG. 7 is a flow chart illustrative of a partial operation processed by the CPU when the MD unit is in the stock mode of FIG. 6.

In the flow chart of FIG. 7, whether a disk is stored in the #1 compartment 50a of the stocker 5 is determined (S31). If the answer is YES in S31, whether a disk is stored in the #2 compartment 50b of the stocker 5 is determined (S32). If the answer is YES in S32, whether a disk is stored in the #3 compartment 50c of the stocker 5 is determined (S33). If the answer is YES in S33, the compartment No. is set to be #4 so that a disk which is newly inserted through the insertion slot 212 can be stored in the #4 compartment 50d (S34). A timer (not shown) in the CPU 233 is then started (S35).

If a disk is not stored in the #1 compartment 50a, as determined in S31, the compartment No. is set to be #1 so that a disk which is newly inserted through the insertion slot 212 can be stored in the #1 compartment 50a, and the resultant data is written into a memory (not shown) provided for the CPU 233 (S36). Then the flow proceeds to S35. If a disk is not stored in the #2 compartment 50b is determined in S32, the compartment No. is set to be #2 so that a disk which is newly inserted through the insertion slot 212 can be stored in the #2 compartment 50b (S37), and the flow proceeds to S35. If a disk is not stored in the #3 compartment 50c is determined in S33, the compartment No. is set to be #3 so that a disk which is newly inserted through the insertion slot 212 can be stored in the #3 compartment 50c (S38), and the flow proceeds to S35.

In these steps S31–S34 and S36–S38, whether a disk is stored in each of the compartments is checked, and then, upon this check, a compartment in which a disk is to be inserted into the unit and stored is automatically set. As is seen from the flow chart of FIG. 7, the control is executed so that disks are sequentially stored in the compartments #1–#4 in the order from smaller number of compartments.

Subsequently, after the timer starts, whether any key has been depressed is determined (S39). If the answer is NO in S39, whether a disk has been inserted through the insertion slot 212 is determined (S40). If the answer is NO in S40, whether the timer started in S35 is time out (S41) is determined. If the answer is YES in S41, the MD unit is allowed to blank the display on the display 117 (S42), and the carrier 3 is permitted to move to a position which does not face the insertion slot 212, for example, a position oppositely facing the compartment 50b (S43). Then the door 217 is made to be stationary; that is, in the locking state, by a known method, thereby completing the stock mode. In other words, when neither the key depression nor the disk insertion is performed within the time duration set by the timer, the stock mode is completed. Thereafter, in response to the locking state of the door 217, the power supply to various sensors, such as the disk insertion sensor 216a, may be constructed to be turned OFF (S43A), thus enabling a reduction in the power consumption.

If any key depression is identified while waiting therefor in S39, whether such key depression has been operated by any of the No. keys 103–106 or the α key 107 is determined (S44). If the answer is YES in S44, whether any of the compartments 50a–50d corresponding to the No. keys 103–106, or the carrier 3 corresponding to the α key 107 is empty is determined (S45). If the answer is YES in S45, the compartment No. which has been set in any of S34, S36, S37, S38 is reset to be replaced by the compartment No. which has been input in S44. Accordingly, the resultant data is rewritten into the memory (S46), and the flow proceeds to S40.

If the answer is NO in S45; that is, a disk is already stored in the compartment corresponding to the depressed key or a disk is already loaded in the carrier 3, the MD unit is permitted to display "DISK" on the display 17 to inform the user that a disk is already stored in the corresponding compartment or the carrier 3. Then the flow proceeds to M4. After the display of the unit in S47, the flow may proceed to S35, in which case, since the timer is set every time, it is identified that the compartment designated in S39 is not empty, the time for designating any empty compartment can be saved and, accordingly, the timer setting time can be effectively used.

If the answer is NO in S44; that is, the key which has been depressed in S39 is by none of the No. keys 103–106 and the α key 107, then whether the stock key 102 has been depressed is determined (S48). If the answer is NO in S48, whether the play key 108 has been depressed is determined (S49). If the answer is NO in S49, whether the eject key 116 has been depressed is determined (S50). If the answer is NO in S50, the flow proceeds to S42, thus completing the stock mode.

If the depression of the stock key 102 is identified in S48, the flow proceeds to S42, thus completing the stock mode. If the depression of the play key 108 is identified in S49, the MD unit is switched to the play mode in S8 of FIG. 5 so as to allow the player 4 to be operated. If the depression of the eject key 116 is identified in S50, the MD unit is switched to the eject mode in S7 of FIG. 5. If the time out is not identified in S41, the flow proceeds to S39 in which the unit is permitted to wait for the key depression or the disk insertion within the set time duration.

Figure 8:
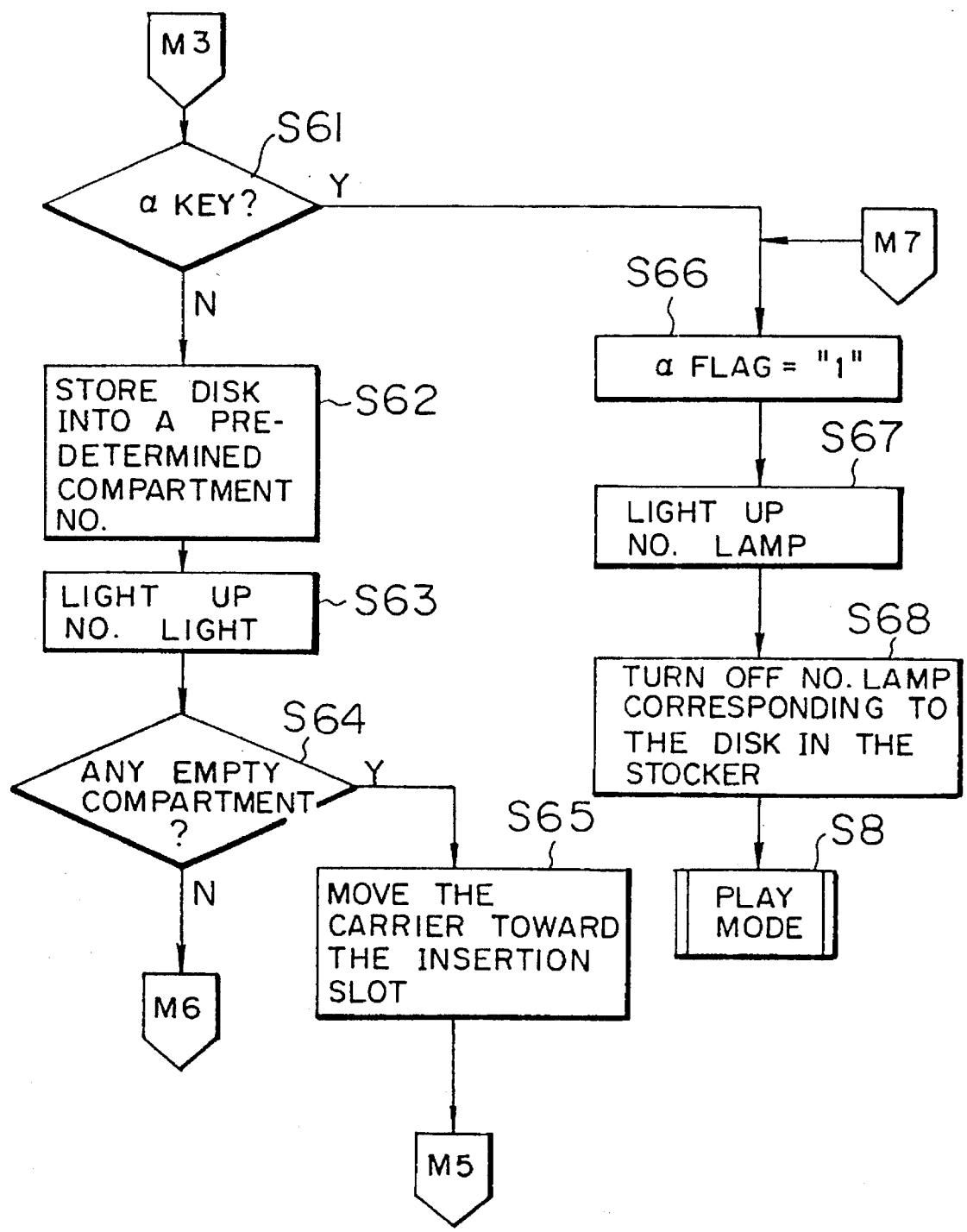
FIG. 8 is a flow chart illustrative of another partial operation processed by the CPU when the MD unit is in the stock mode.

If the disk insertion is identified in S40, the flow proceeds to M3 in which the control illustrated in the flow chart of FIG. 8 is executed.

In the flow chart of FIG. 8, whether the key depression identified in S39 is by the α key 107 is determined (S61). It should be noted that when the key depression is not identified in S39 and the disk insertion is identified in S40, the answer shall be NO in S61. If the answer is NO in S61, the disk which is identified to have been inserted in S40 is stored in the compartment corresponding to the compartment No. which has been set in any of S34, 36, 37, 39 and 46 (S62), and one of the No. lamps 103a–106a indicating the corresponding compartment No. is permitted to light up (S63).

Even after the disk is stored in S62, whether any of the compartments 50a–50d of the stocker 5 is still empty is determined (S64). If any empty compartment is available, the carrier 3 is permitted to move to a position oppositely facing the insertion slot 212 (S65), and the flow proceeds to M5. That is, the operation starts to set the compartment No. in which the subsequent disk is to be stored. If the answer is NO in S64, in other words, there is no empty compartments 50a–50d, the flow proceeds to M6.

If the depression of the α key 107 is identified in S61, the α flag is switched to "1" (S66). The No. lamp 107a corresponding to the α key 107 is allowed to light up (S67), and any of the No. lamps (103a –106a) which are lighting up to inform the user that disks are stored in the corresponding compartments of the stocker 5 are allowed to go out. Then the MD unit is switched to the play mode in S8 of FIG. 5 in which the α disk is placed on the player 4 and reproduced.

In the flow chart of FIG. 9, if none of the compartments 50a–50d of the stocker 5 is empty, the subsequent disk which is inserted through the insertion slot 212 is automatically identified as the α disk, and the unit is allowed to display "NEXT α-MODE" on the display 117 to inform the user that the disk which is to be inserted is to be the α disk (S71). Then, whether a disk is loaded in the carrier 3 is determined (S72). If the answer is YES in S72, the unit is allowed to display "WAIT" to inform the user that a disk cannot be inserted and to urge the user to wait (S73). Then whether a disk is being reproduced is determined (S74). If the answer is YES in S74, the player 4 in the reproducing state is stopped (S75), and the disk loaded in the carrier 3 on the player 4 is stored in the compartment No. which was set when the disk was inserted (S76).

Subsequently, the carrier 3 is moved back to a position oppositely facing the insertion slot 212 (S77), and the MD unit is manipulated to display "STOCK STANDBY" on the display 117 to inform the user that a disk can now be inserted (S78). The timer is then started (S79), and the unit is permitted to wait for the key depression or the disk insertion (S80, S81).

If a disk is not loaded in the carrier 3 in S72, the flow proceeds to S77 and the unit is permitted to display "STOCK STANDBY" in S78. If a disk is not reproduced in S74, the flow proceeds to S76 in which a disk loaded in the carrier 3 is returned to a predetermined compartment No., and the unit is allowed to wait for another disk to be inserted.

If the key depression is identified in S80, whether the α key 107 has been depressed is determined (S83). If the answer is YES in S83, the flow proceeds to S81. If the disk insertion is identified in S81, the flow proceeds to M7, and a disk in the carrier 3 can now be reproduced. On the other hand, if the depression of the α key 107 is not identified in S83, the flow proceeds to M8, thus completing the stock mode.

As will be clearly understood from the foregoing description, the present invention offers the following advantages.

When the MD unit is in the stock mode, any empty compartment of the stocker 5 is detected and a compartment in which a disk is to be stored is set. If no compartment is designated by the depression of No. keys 103–106, the disk is stored in the compartment which is set as described above. Accordingly, the user does not have to depress one of the No. keys 103–106 to designate an empty compartment.

If a disk is not inserted after a lapse of a predetermined time when an empty storage is automatically designated, the stock mode is automatically canceled and, as a result, the door 217 is locked, thereby preventing extraneous matter from entering into the MD unit through the door 217.

If the door 217 is unlocked, the sensors, such as the disk insertion sensor 216a for detecting the insertion of a disk, should be supplied with power. In the present invention, however, the door 217 is locked after a lapse of a predetermined time. Concurrently, power supplied to the circuit devices relating to the sensors is cut off, thereby saving the power consumption.

Also, when the MD unit is operated as a single disk player; that is, when the α key 107 is depressed to allow the unit to be switched to the α mode, the No. lamps 103a–106a which have been lit corresponding to the compartments 50a–50d in which disks are stored go out, and only the No. lamp 107 corresponding to the α key 107 is lit. Hence, the MD unit has good operational performance as a single disk player.

When the α mode is canceled; that is, when the α disk inserted while the unit was in the α mode is ejected, the No. lamps 103a–106a which have been gone out may be lit again. This operation will be described with reference to the flow chart of FIG. 10.

As described above, the disk inserted into the unit while the unit was in the α mode is ejected so as to cancel the α mode. An explanation will thus be given of the related factors to the eject mode S7 of FIG. 7. That is, a description will be given of the case where the eject key is depressed while the unit is in the α mode.

Figure 10:
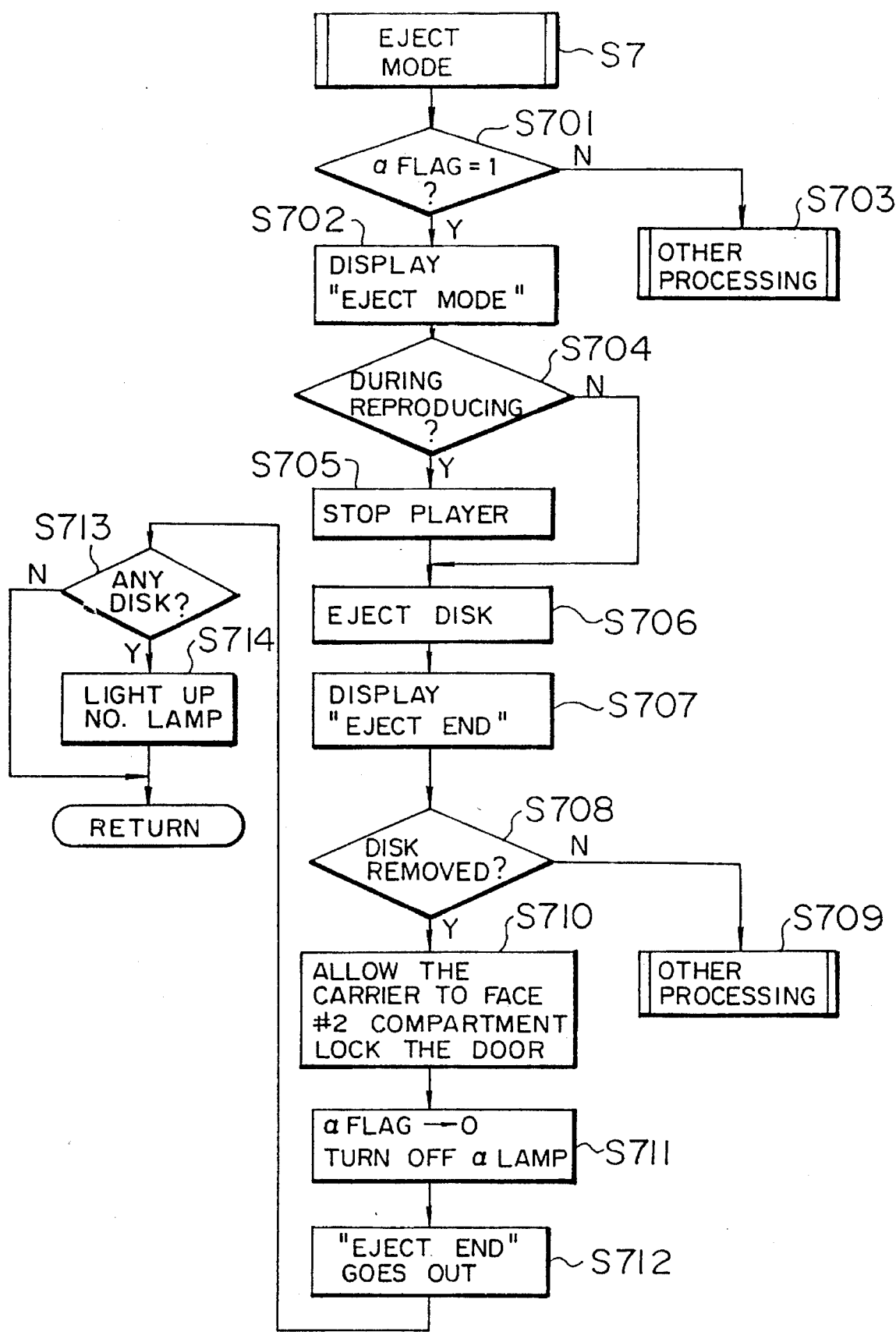
FIG. 10 is a flow chart illustrative of the cancellation of the α mode by ejecting a disk.

In the flow chart of FIG. 10, whether the α flag is "1" is determined (S701). If the answer is NO in S701, the flow proceeds to S703 in which another type of processing is executed. If the answer is YES in S701, the unit is permitted to display "EJECT MODE" on the display 117 to indicate that the unit is switched to the eject mode (S702). Then, whether the disk loaded in the carrier 3 is currently reproduced is determined (S704).

If the disk is currently reproduced on the player 4, the player 4 is stopped (S705) and the disk is ejected to move to the reloading position (S706). Subsequently, the unit is allowed to display "EJECT END" to indicate the completion of the eject processing (S707).

Further, whether the disk in the reloading position has been removed is determined by the disk removal sensor 216d (S708). If the answer is NO in S708, the flow proceeds to S709 in which another type of processing is executed. If the answer is YES in S708, the carrier 3 is moved to a position opposedly facing the #2 compartment, and the door 217 is locked (S710). The current α flag is switched to "0" and the α lamp goes out (S711). "EJECT END" on the display 117 disappears (S712). Then, whether a disk is stored in the MD unit is determined (S713). As described above, the loading completion sensor 216b and the stock completion sensors 51a–51d provided for the stocker 5 are used for the above detection in S713. If the answer is YES in S713, the No. lamps 103a–106a corresponding to the compartments in which disks are stored are lit (S714), thus completing the eject mode.

Although in this embodiment the carrier 3 opposedly faces the #2 compartment after the disk is removed in S708, it may opposedly face the insertion slot 212 so as to wait for another disk to be loaded.

Also, although in the above embodiment the carrier 3 is moved to face the opening of the compartment 50b when the stock mode is completed, it may be placed in any position as long as the door 217 is locked.

In this embodiment, a disk is stored in the designated No. compartment in S62 of FIG. 8. However, a disk may be temporarily placed on the player 4 so that the contents of TOC (Table of Contents) information peculiar to the disk, for example, the title of the album recorded on the disk, and the total performance time, can be read and stored in the memory 225, and then, may be stored in the designated No. compartment. In such a case, when the disk is next reproduced, the operations, such as the selection of pieces of music and the like, can be executed promptly.

If the time out is detected in S41 of FIG. 7, the MD unit may be switched to the play mode in S8, and a predetermined disk, for example, the lastly stored disk or the initially stored disk, may be placed on the player 4 and the data recorded on the disk may be reproduced, in which case the user can save time to perform the operation of the disk reproduction.

In S83 of FIG. 9, if the depression of the α key is identified, instead of completing the stock mode in the above embodiment, the type of the depressed key may be determined and the unit may be switched to the play mode or the eject mode in S49 or S50.

Also, according to the above embodiment, disks are stored in the order of the compartments 50a, 50b, 50c and 50d of the stocker 5 as #1, #2, #3 and #4, they may be stored in a reverse order, 50d, 50c, 50b and 50a, or alternatively, in the order of 50b, 50c, 50d, and 50a, in which case, the order of 50c and 50d may be reversed. Further, the invention is not limited to the above orders of storing disks, and many variations may be applicable.

Although the MD unit including the carrier 3 of the present invention is capable of storing five disks maximum, the number of compartments may be increased and, accordingly, the unit may be capable of storing more number of disks.

Moreover, in this embodiment, MD is used as a recording medium, and an MD unit is thus applied to the present invention. However, an optical recording medium, such as CD, a video disk, or a magnetic recording medium, such as a floppy disk, may be used as a recording medium, in which case, units using such recording media may be applicable.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An information processing apparatus for performing a predetermined processing to the information recorded in a recording medium inserted into said apparatus, said apparatus including a plurality of storing positions capable of storing the recording medium and a holding member (3) movable between a processing position at which said predetermined processing is performed and positions opposed to each of said storing positions for holding the recording medium, said information processing apparatus comprising:

first designating means for initially designating one of said plurality of storing positions to which the recording medium is to be stored;

second designating means for independently designating one of said plurality of storage positions at which the inserted recording medium is to be located; and determining means for determining the position designated by said second designating means as a position at which the recording medium is to be located when such a position is available and said second designating means has designated a position other than the initial position of the first designating means.

2. The apparatus according to claim 1, wherein said processing performed to the information is a reproducing operation of the recorded information.

3. The apparatus according to claim 1, further comprising:

timer means for measuring a predetermined period of time in response to the designation by said first designating means; and inhibiting means for inhibiting an insertion of a recording medium into said apparatus in response to an absence of both the designation by said second designation means and the insertion of a recording medium during said predetermined period of time.

4. The apparatus according to claim 3, further comprising processing means for performing said predetermined processing to a predetermined recording medium having been inserted into said apparatus in response to the inhibition by said inhibiting means.

5. The apparatus according to claim 4, wherein said predetermined recording medium is the one which has been initially inserted.

6. The apparatus according to claim 4, wherein said predetermined recording medium is the one which has been lastly inserted.

7. The apparatus according to claim 1, wherein said second designating means designates one of positions selected from a group comprising said plurality of storing positions and said processing position.

8. The apparatus according to claim 1, wherein each of said plurality of storing positions is arranged in a row along a vertical direction.

9. The apparatus according to claim 7, further comprising:

first indicating means for indicating a presence of a recording medium in each of said plurality of storing positions; and second indicating means for indicating a designation of said processing position by said second designating means.

10. The apparatus according to claim 9, wherein said first indicating means comprises a plurality of LED indicators respectively corresponding to each of said plurality of storing positions.

11. The apparatus according to claim 9, further comprising indication controlling means for controlling the indication of said first indicating means so as to be turned off in response to the designation of said processing position by said second designating means.

12. The apparatus according to claim 1, further comprising member moving means for moving said holding member to a position at which said holding member receives a recording medium inserted into said apparatus when a position other than said processing position is designated by said second designating means.

13. The apparatus according to claim 1, further comprising ejecting means for ejecting the recording medium held in said holding member under the condition that said processing position has been designated by said second designating means.

14. An information reproducing apparatus for reproducing information in a recording medium inserted in said apparatus comprising:

storing means including a plurality of storing positions arranged in a row along a vertical direction for storing the recording medium;

holding means movable between a reproduction position at which the information in the recording medium is to be reproduced and positions opposed to each of said storing positions for holding the recording mediums inserted into said apparatus;

first designating means for designating one of said positions to which the recording medium is to be stored;

second designating means for designating a position at which the inserted recording medium is to be located, said position designated by said second designating means being selected from a group comprising said reproducing position and said plurality of storing positions; and determining means for determining the position designated by said second designating means as a position at which the recording medium is to be located when said first and second designating means designate different positions.

15. An information reproducing apparatus for reproducing information in a recording medium inserted in said apparatus, comprising:

a housing having an opening for receiving recording media;

storing means for storing a plurality of recording media at discrete positions within the apparatus;

means for reading information on a recording medium;

means for translating a recording medium to and from the storage means and also for positioning the recording medium on the reading means; and control means for designating one of the plurality of discrete positions of the storing means for storing the recording medium in a first mode of operation and designating the translating means for storing the recording medium in a second mode of operation, the second mode of operation being automatically selected when the plurality of discrete positions are full.

16. An information reproducing apparatus for receiving a plurality of recording medium and reproducing information therein comprising:

a housing having an aperture for receiving and dispensing said plurality of recording medium one at a time;

an array of storage positions disposed within said housing for storing said plurality of said recording mediums;

means for reading the information on one of said recording medium spaced from said array of storage positions;

means for moving said recording medium from said means for reading said recording medium to said array of storage positions and said aperture;

control means for automatically identifying which storage positions within said array in a predetermined sequence is to receive said recording medium based on the availability of said storage position; and means for overriding said control means and independently designating which storage position within said array is to receive said recording medium.

17. An apparatus as recited in claim 16 further comprising a door covering said aperture, and means for locking said door in a closed position whenever said means for shuttling said recording medium is not aligned with said aperture to receive a storage medium therein.

18. An apparatus as recited in claim 16 further comprising a means to move said recording medium directly between said aperture and said means for reading said information, and from said means for reading said information to said aperture whereby said storage positions are bypassed.

19. An apparatus as recited in claim 16 wherein the means for overriding the control means is a user supplied input, said apparatus further comprising means for signalling said user when said user supplied input corresponds to an occupied storage position.

20. An apparatus as recited in claim 19 wherein said control means controls the positioning of the recording medium within the array of storage positions if a predetermined time expires after said user supplied input corresponds to an occupied storage position.

21. An information reproducing apparatus for reproducing information stored in a recording medium inserted in said apparatus comprising:

a housing having an aperture for receiving a plurality of said recording medium;

an array of storage positions disposed within said housing for storing said plurality of recording mediums;

means for reproducing the information stored in one of said recording mediums, said reproducing means spaced from said plurality of storage positions and said aperture;

means for transporting said recording medium between said aperture, said plurality of storage positions, and said means for reproducing information;

first means for determining the presence of a recording medium in said plurality of storage positions;

means for automatically designating one of said plurality of storage positions to receive a recording medium inserted in said housing in accordance with a predetermined sequence and a determination by said first means that a storage position is unoccupied;

timer means for measuring a predetermined time started by the completion of the means for automatically designating one of said storage positions;

user means for independently designating one of said plurality of storage positions to receive said recording medium; and second means for determining whether said user means has designated a storage position which is different from said automatic designating means within said predetermined time, said storage position is designated for receiving said recording medium when said user means designates an unoccupied storage position within said predetermined time.

\* \* \* \* \*